(12) United States Patent
Bader et al.

(10) Patent No.: US 10,552,766 B2
(45) Date of Patent: Feb. 4, 2020

(54) SYSTEM IMPLEMENTING ELECTRONIC CASE VERSIONING

(71) Applicant: International Business Machines Corporation, Armonk, NY (US)

(72) Inventors: Edward L. Bader, Los Angeles, CA (US); Jean-Marc Costecalde, Irvine, CA (US)

(73) Assignee: International Business Machines Corporation, Armonk, NY (US)

(*) Notice: Subject to any disclaimer, the term of this patent is extended or adjusted under 35 U.S.C. 154(b) by 330 days.

(21) Appl. No.: 15/430,285

(22) Filed: Feb. 10, 2017

(65) Prior Publication Data
US 2018/0232383 A1 Aug. 16, 2018

(51) Int. Cl.
*G06Q 10/00* (2012.01)
*G06Q 10/10* (2012.01)
*G06F 16/11* (2019.01)

(52) U.S. Cl.
CPC .......... *G06Q 10/00* (2013.01); *G06F 16/128* (2019.01); *G06Q 10/10* (2013.01); *G06Q 10/103* (2013.01); *G06F 2201/84* (2013.01)

(58) Field of Classification Search
CPC ...... G06Q 10/00; G06Q 10/10; G06Q 10/103; G06F 2201/84; G06F 16/128
USPC ....................................................... 707/695
See application file for complete search history.

(56) References Cited

U.S. PATENT DOCUMENTS

| 9,632,874 | B2* | 4/2017 | Pawar .................. G06F 16/128 |
| 10,210,048 | B2* | 2/2019 | Sancheti ............. G06F 9/45558 |
| 2005/0027757 | A1 | 2/2005 | Kiessig et al. |
| 2006/0224626 | A1 | 10/2006 | Lakshminath et al. |
| 2008/0072209 | A1 | 3/2008 | Farrah et al. |
| 2009/0150168 | A1* | 6/2009 | Schmidt ................. G06Q 10/10 705/311 |
| 2014/0032502 | A1 | 1/2014 | Kraley |
| 2015/0066859 | A1* | 3/2015 | Blake .................. G06F 11/1438 707/649 |

FOREIGN PATENT DOCUMENTS

| EP | 2418592 A1 | 2/2012 |
| WO | 2006/012533 A2 | 2/2006 |
| WO | 2013/176860 A2 | 11/2013 |

OTHER PUBLICATIONS

Jatowt, Adam, et al. "What can history tell us?: towards different models of interaction with document histories." ACM conference on Hypertext and hypermedia. ACM, 2008.

* cited by examiner

*Primary Examiner* — Robert W Beausoliel, Jr.
*Assistant Examiner* — Arthur Ganger
(74) *Attorney, Agent, or Firm* — Patterson + Sheridan, LLP (57) ABSTRACT

Techniques disclosed herein provide electronic case versioning in a case management system. A request to capture a snapshot of an electronic case at a current point in time is received. The snapshot provides a record of the electronic case at the current point in time. Information associated with the electronic case at the current point in time is identified. The information is stored in an object representing the snapshot.

13 Claims, 6 Drawing Sheets

SYSTEM IMPLEMENTING ELECTRONIC CASE VERSIONING

BACKGROUND

The present disclosure relates to content management systems, and more specifically, to electronic case versioning in a content management system.

Generally, a case is a container that groups digital files (e.g., word processing document, images, audio, etc.), workflows, and metadata relating to the case, files, and workflows. An enterprise may configure case management systems to open, close, and maintain cases for the enterprise. For example, using a case management application, individuals in the enterprise may update the case by adding new documents, editing files, advancing a workflow state, and the like.

Typically, various parties may evaluate a case during its lifecycle, such as during litigation or an audit. For example, an auditor may need a record of documents associated with a case at a particular moment in time. Further, the record would need to comply with policies ensuring the integrity of the documents being those documents at that moment in time (e.g., a document A was indeed a second version of the document at a point in time five years ago). Further still, such events can be disruptive in ongoing cases for those in the enterprise that are associated with the case and may need to advance workflow states.

SUMMARY

One embodiment presented herein discloses a method. The method generally includes receiving, via a processor, a request to capture a snapshot of an electronic case at a current point in time. The method also includes identifying information associated with the electronic case at the current point in time. The information associated with the electronic case is stored in an object representing the snapshot.

Another embodiment presented herein discloses a computer program product. The computer program product includes a computer-readable storage medium storing instructions, which, when executed on a processor, performs an operation. The operation itself generally includes receiving, via a processor, a request to capture a snapshot of an electronic case at a current point in time. The operation also includes identifying information associated with the electronic case at the current point in time. The information associated with the electronic case is stored in an object representing the snapshot.

Still another embodiment presented herein discloses a system including a processor and a memory. The memory includes program code storing instructions, which, when executed on a processor, performs an operation. The operation itself generally includes receiving, via a processor, a request to capture a snapshot of an electronic case at a current point in time. The operation also includes identifying information associated with the electronic case at the current point in time. The information associated with the electronic case is stored in an object representing the snapshot.

DETAILED DESCRIPTION

Embodiments presented herein disclose techniques for capturing a snapshot of an electronic case in an enterprise case management system. A snapshot provides a record of the electronic case at a given point in time. In one embodiment, a case management application provides a snapshot tool that evaluates a specified case and identifies metadata, files, and workflow states associated with the case. The snapshot tool generates a snapshot that links to a state of the case at a given point in time. Particularly, the snapshot includes metadata describing the case (e.g., case department, identification number, timestamps, etc.), links or copies of files associated with the case, and a workflow state. A user may, via the snapshot tool, generate as many snapshots of an electronic case as needed (e.g., manually or automating capture of snapshots at a specified interval such as once every month, etc.).

Advantageously, capturing a snapshot provides a trusted record of an electronic case at a given point in time of the lifecycle of the case. A user may retrieve, via the snapshot tool, a snapshot of a case for a specified moment in time, such as at a particular date, or a range of dates. Further, the case management application may then evaluate the retrieved snapshot to identify a roster of files and corresponding versions of each of those files at the time that the snapshot was captured. Further still, the case management application identifies a workflow state at the time the snapshot was captured. Doing so allows the case management system to generate a presentation of the snapshot data, e.g., for display on a user interface (e.g., through a web browser of a user accessing the case management application). The presented snapshot allows the user to view a collection of the files and workflow states as captured at a given moment of time.

Figure 1:
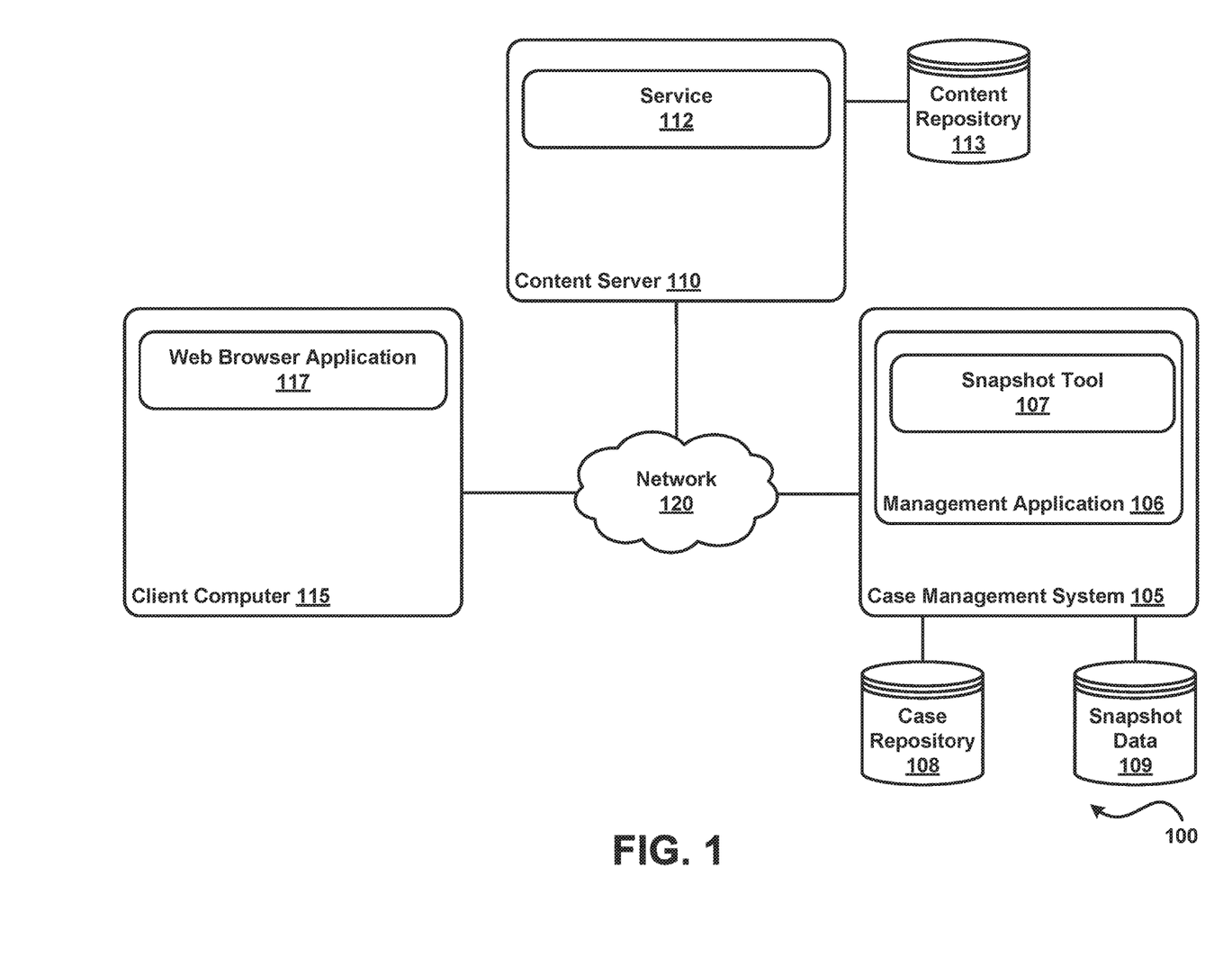
FIG. 1 illustrates an example computing environment, according to one embodiment.

FIG. 1 illustrates an example computing environment 100, according to one embodiment. As shown, the computing environment 100 includes a case management system 105, a content server 110, and a client computer 115, each interconnected via a network 120. In one embodiment, the computing environment 100 represents an enterprise network. The network 120 may correspond to, e.g., a local area network connected to a larger network such as the Internet, or the Internet. The client computer 115 may correspond to a physical computing system or a virtual computing instance executing on a cloud network. Similarly, the case management system 105 and content server 110 may correspond to one or more physical computing systems or a virtual computing instance executing on the cloud.

The case management system 105 maintains content that is organized in cases. Generally, a case is a container that groups various files, such as documents, images, audio, and video that pertain to a given enterprise matter. For example, the case may include files managed by a service 112 executing on the content server 110, which hosts a content repository 113 storing the files. The case may also include metadata specifying a version for each of the files. Further, the case includes workflows that indicate a given stage of a task in the case (e.g., an initialization task, processing task, review task, approval task, etc.) as well as data associated with each workflow stage.

For example, assume that a case corresponds to a trip reimbursement matter. Files in the case may include itinerary documents (e.g., in a word processing application or spreadsheet application format), expense receipts (e.g., scanned as images or portable documents), and emails saved to the content repository 113. Pointers linking to the files may be associated with the case (and stored within the corresponding case container). Alternatively, the files themselves may be separately stored as part of the case. Cases themselves may be stored as part of a case repository 108.

As shown, the case management system 105 includes a management application 106. The management application 106 may provide a graphical user interface for a user (e.g., an employee, manager, reviewer, etc.) to build, edit, and update cases, such as by opening a case, adding or removing files to the case, updating file versions, modifying a workflow of the case, and closing the case. For example, a user may access the management application 106 via a web browser application 117 executing on the client computer 115 to create cases and associate files with the cases. The management application 106 may also perform workflow tasks such as sending a case to a reviewer or starting a new case based from the case, e.g., based on enterprise guidelines.

Typically, cases are modified throughout its lifecycle. For instance, a user may add files to or update files in a given case. For example, following an approval stage in a workflow for a given case relating to a trip reimbursement, a user may create a new version of a spreadsheet file associated with the case. The management application 106 may associate the new version of the spreadsheet file with the case and also create metadata indicating the file version and when the modification was made.

Further, cases can be subject to external review, such as for an audit or in litigation. During an external review of a case, the reviewer might need to see the contents of case not only at its most recent state, but at a state from a given point in time (e.g., at the case's inception, at the midpoint of the case, etc., prior to a given workflow stage). To address this issue, the management application 106 includes a snapshot tool 107. In one embodiment, the snapshot tool 107 captures snapshots of an electronic case for an enterprise (as snapshot data 109).

As described herein, a snapshot is a file object or structure that provides a trusted record of a case as captured at a given point in time. The snapshot includes a roster of files and metadata describing a version of each file at the point in time. Further, the snapshot includes metadata describing the case itself, such as a name of the case, case creator, case identification number, and a listing of users that accessed the case. Further still, the snapshot provides a state of each workflow associated with the case, as captured at a given moment in time.

Figure 2:
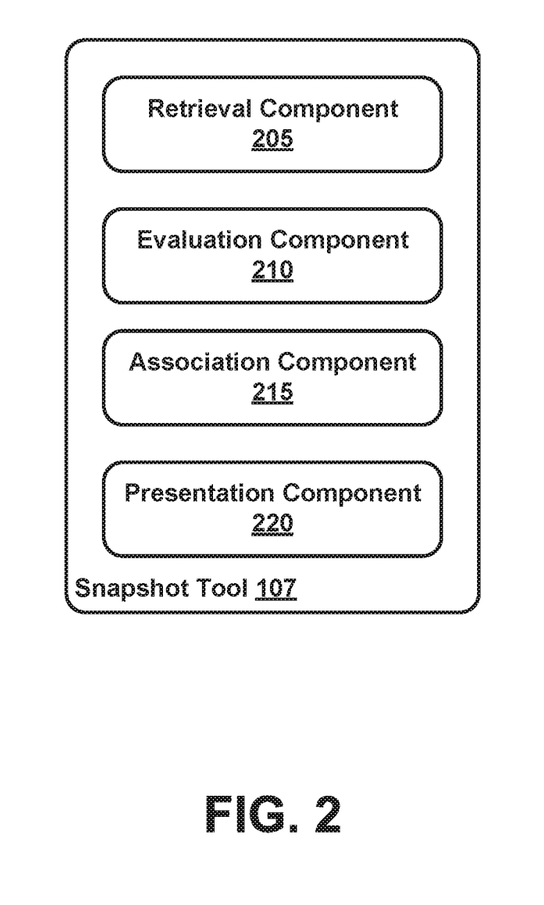
FIG. 2 further illustrates the snapshot tool described relative to FIG. 1, according to one embodiment.

FIG. 2 further illustrates the snapshot tool 107, according to one embodiment. As shown, the snapshot tool 107 includes a retrieval component 205, an evaluation component 210, an association component 215, and a presentation component 220. Of course, FIG. 2 merely depicts a conceptual diagram of functions performed by the snapshot tool 107. Embodiments may be adapted to various configurations other than depicted.

The retrieval component 205 identifies a case specified in a request to capture a case snapshot. The request may be sent from a user of the management application 106 via a user interface provided by the management application 106. The request may also be sent automatically at specified intervals via the management application 106. For example, the user may set, through the user interface, an interval during which to capture a snapshot for a given case, such as once every week, once every month, once every six months, etc. The retrieval component 205, in response to the request, accesses the case repository 108 and obtains the case specified in the request. For example, in one embodiment, the case repository 108 is a data store containing case containers. The request may specify an identifier associated with the case, and the retrieval component 205 may look up and retrieve the case using the identifier.

The evaluation component 210 accesses the case and identifies information to include in the snapshot. For instance, the evaluation component 210 identifies metadata associated with the case. Case metadata may include a name of the case, relevant dates associated with the case (e.g., a creation date, closing date, etc.), department associated with the case, creator of the case, status, and the like. Further, the evaluation component 210 identifies files associated with the case. To do so, the evaluation component 210 may access a listing of the files associated with the case. The listing may be included as part of the case itself and provide a location for each of the files associated with the case. The evaluation component 210 also determines a current version for each of the files, e.g., by examining case metadata or the listing of the files. Further still, the evaluation component 210 identifies any completed or ongoing workflows associated with the case. Such workflows may be included with a given case in the case repository 108. The evaluation component 210 may examine each workflow for metadata associated with each stage of the workflow, as well as a current state of the workflow (which may itself be indicated in the workflow metadata).

The association component 215 may generate a snapshot object for storing information relating to the case. The association component 215 may create a new object corresponding to the snapshot and then associate the case metadata, files, and workflow state with the snapshot. For example, the association component 215 may store the case metadata in a file in the snapshot. Further, the association component 215 may also store identified workflow states in the snapshot.

In addition, the association component 215 may determine whether to store a link to a given file in the snapshot or to generate a copy of the file instead. The association component 215 may evaluate a volatility of the file to do so. For instance, the association component 215 may identify a type of repository storing the file. The association component 215 may store a pointer to a version of the file if the file is stored on a repository that supports file versioning. The association component 215 may generate and store a copy of the file if the repository does not support file versioning, or does not lock content of a previous version. The association component 215 may store the snapshot in a repository storing snapshots for the enterprise network (e.g., as snapshot data 109). The snapshot is associated with the case and may be stored at a location containing snapshots taken for that case.

The presentation component 220 generates a view of the snapshot in response to a request, e.g., by a reviewer of a case, for a case as captured at a given point in time. The retrieval component 205 may obtain the snapshot from a snapshot repository (e.g., snapshot data 109) in response to a request from the management application 106 to present the snapshot. The evaluation component 220 may extract the snapshot information and send the information to the presentation component 220. The presentation component 220 may load the information into a graphical user interface of the management application 106, e.g., using APIs provided by the management application 106. Doing so allows a reviewer to view the contents of the snapshot, e.g., via the web browser application 117.

Figure 3:
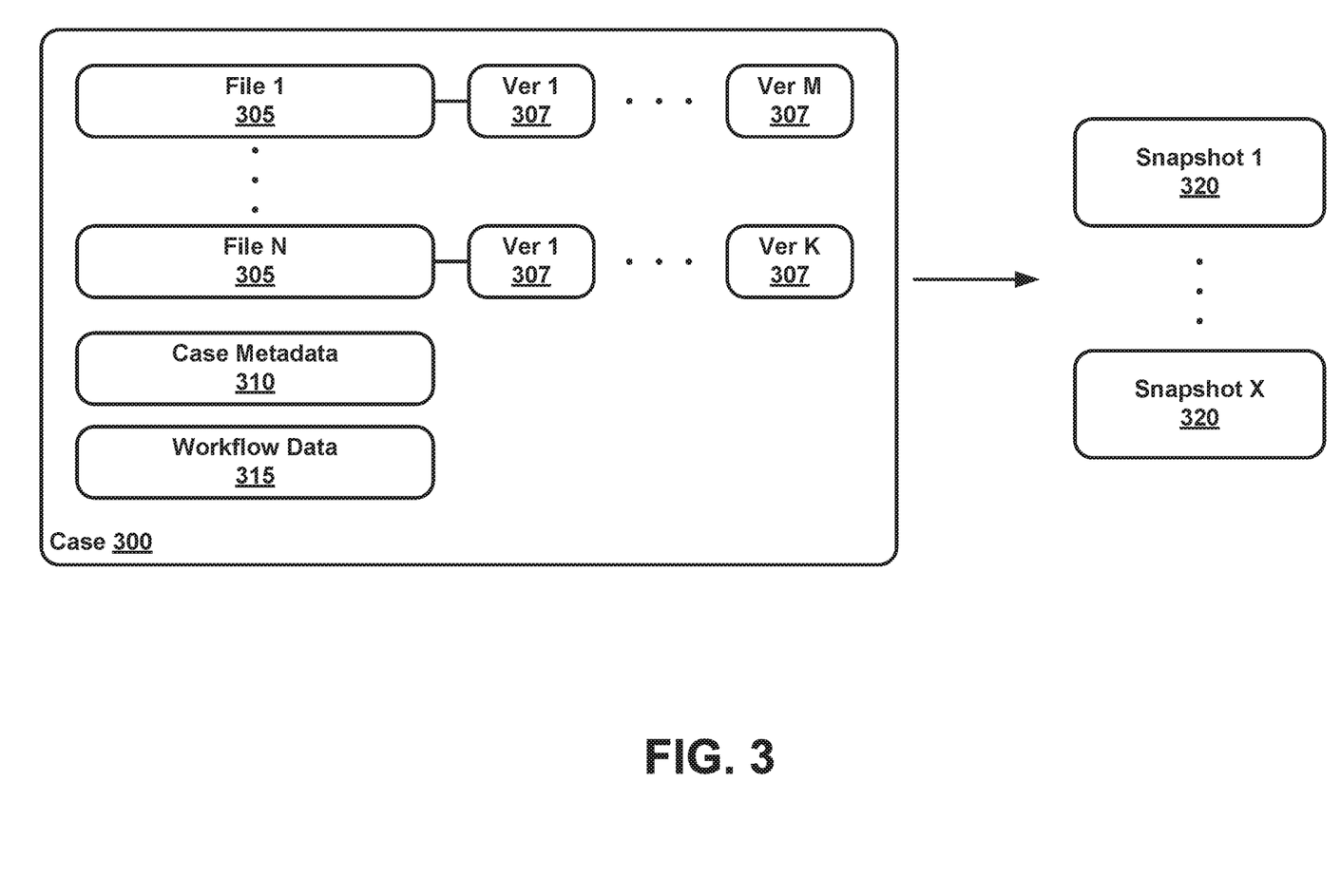
FIG. 3 illustrates an example case used to contain files and related workflows, according to one embodiment.

FIG. 3 illustrates an example case 300, according to one embodiment. As shown, the case 300 includes one or more files 1-N 305, case metadata 310, and workflow data 315. In some instances, the files 1-N 305 themselves may have corresponding versions associated with the case 300. Illustratively, the file 1 305 is associated with multiple versions 1-M 307, and the file N 305 is associated with multiple versions 1-K 307. The files 305 may be stored in the case 300 itself, or may correspond to links to the actual files stored in a content repository, such as the content repository 113. As stated, the case metadata 310 may include information describing the case 300, such as case title, creator, case creation date, and the like. And workflow data 310 includes one or more workflows representing tasks and procedures relating to the case, e.g., review pipelines, resolution tasks, etc.

The snapshot tool 107 may capture snapshot data at various points of time in the lifecycle of the case 300. Illustratively, the case 300 is associated with multiple snapshots 1-X 320. Each of the snapshots 1-X 320 may be taken successively at various stages of the lifecycle of the case 300. During the lifecycle, changes may be made to the case 300, such as new files 305 being added, new versions 307 of the files 305 being added, progressions through the workflow data 315, modifications in the case metadata 310, and the like.

As an example, a snapshot 1 320 may provide a record of the case 300 in its initial stage. The snapshot 1 320 may include a pointer to version 1 307 corresponding to the file 1 305. Further, the snapshot 1 320 may include case metadata 310 specifying the name of the case, date created, location of the file 1 305, etc. In addition, the snapshot 1 320 may provide current states of the workflow data 315. For example, at an initial stage of the case 300, the case 300 may be associated with a case creation workflow with a state indicating that the case was just opened.

As another example, a snapshot X 320 may provide a record of the case 300 at a later stage of the case lifecycle. The snapshot X 320 may include pointers several files 1-N 305 at a version 307 corresponding to when the snapshot tool 107 captured the snapshot X 320. Further, the snapshot X 320 may include a copy of some of the files 1-N 305, for those files 305 that are stored in a repository that does not lock content with each transition to a new version. Case metadata 310 may include a listing of users who have accessed the case 300 since the case was opened.

Figure 4:
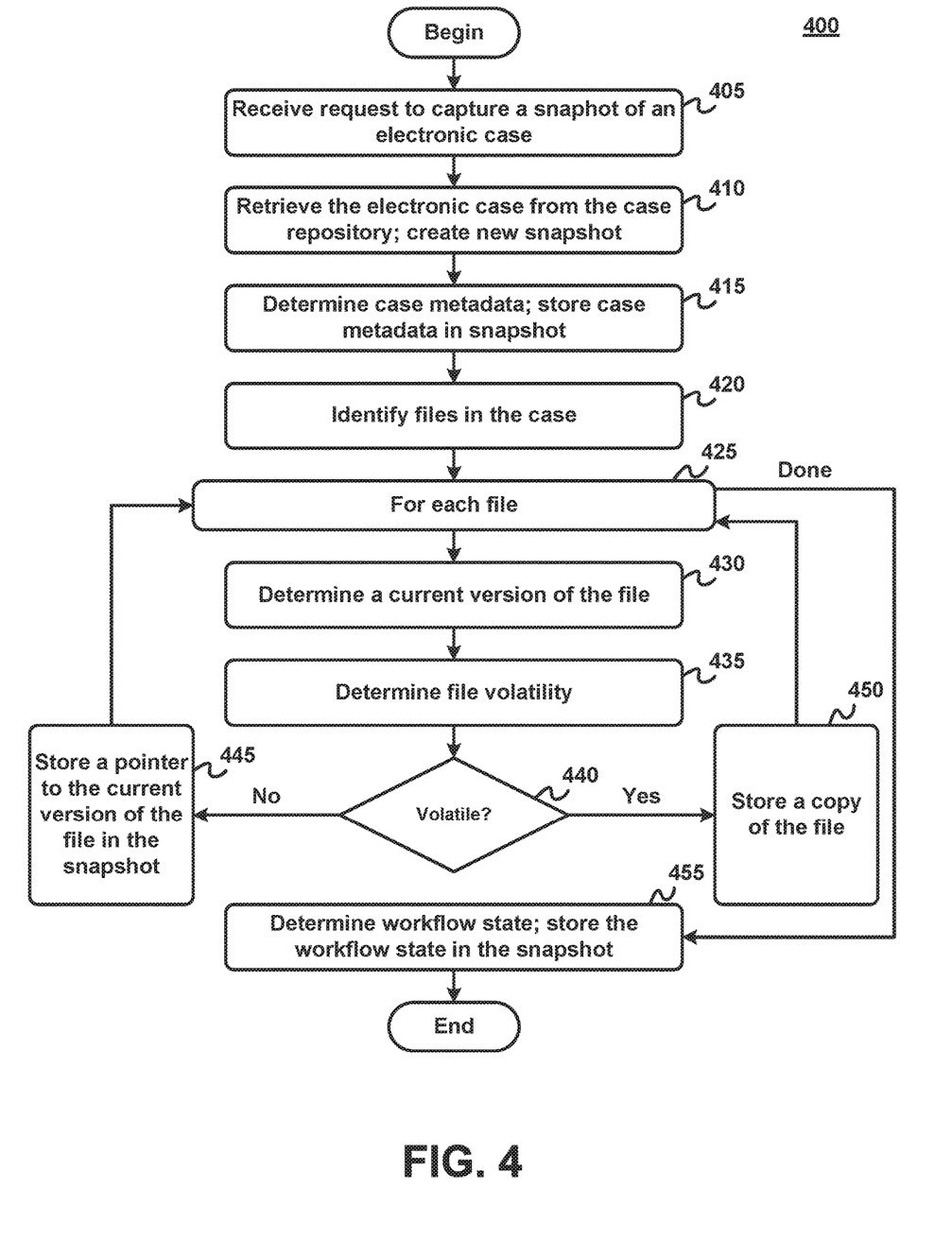
FIG. 4 illustrates a method for capturing a snapshot of an electronic case, according to one embodiment.

FIG. 4 illustrates an example method 400 for capturing a snapshot of an electronic case, according to one embodiment. As shown, the method 400 begins at step 405, where the snapshot tool 107 receives a request to capture a snapshot of an electronic case. As stated, the snapshot tool 107 receives the request from the management application 106, e.g., by operation by a user via a web browser or automatically. The request may indicate an identifier of the case for look up. At step 410, the retrieval component 205 obtains the specified case from the case repository 108. The snapshot tool 107 may generate a new snapshot file structure and store the snapshot in a repository maintained by the case management system 105 (e.g., as snapshot data 109).

At step 415, the evaluation component 210 evaluates metadata associated with the case. The association component 215 stores the case metadata in the snapshot. For example, the association component 215 may generate a text file or markup language document that contains the case metadata. At step 420, the evaluation component 210 identifies the files associated with the case. For example, some files associated with the case may be stored within the case. Other files may be stored separately on a content repository and linked by a pointer stored in the case. In addition, a listing may be provided with the case that enumerates the files associated with the case. The evaluation component 210 identifies these files and enters a loop at step 425 for each file for steps 430-450.

At step 430, the evaluation component 210 determines a current version of the file. At step 435, the evaluation component 210 determines a volatility of the file, which allows the evaluation component 210 to determine whether to create a pointer to the version of the file or to generate a copy of the file to associate with the snapshot. At step 440, the evaluation component 210 determines whether the file is volatile, e.g., based on the type of content repository in which the file is maintained. For example, if the content repository supports file versioning and locks the content of old versions of a file, then at step 445, the association component 215 stores a pointer to the current version of the file in the snapshot. However, if, for example, the content repository allows changes to be made to older versions of the file, then at step 450, the association component 215 generates a copy of the file and stores the copy in the snapshot.

At step 455, the evaluation component 210 determines a current state of each of the workflows associated with the case. To do so, the evaluation component 210 may access the workflow data stored in the case and identify the most recent state of the workflow. Once identified, the association component 215 stores the current workflow states in the snapshot.

Figure 5:
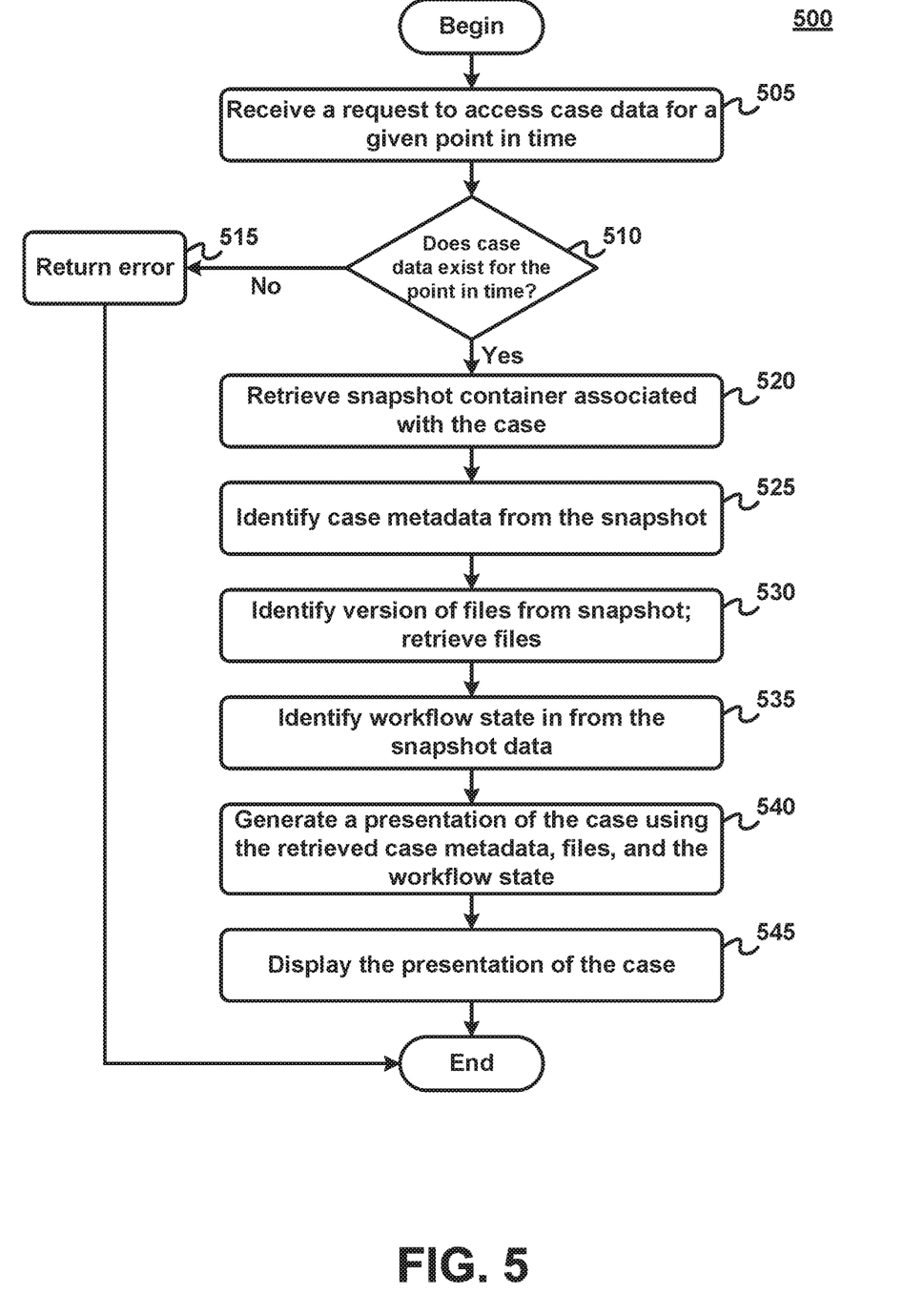
FIG. 5 illustrates a method for retrieving a snapshot associated with an electronic case, according to one embodiment.

FIG. 5 illustrates a method 500 for retrieving a snapshot associated with an electronic case, according to one embodiment. As shown, the method 500 begins at step 505, where the snapshot tool 107 receives a request to retrieve a snapshot associated with an electronic case. The request may include an identifier associated with the case, as well as a date associated with the desired snapshot. Further, the request may be in response to a selection of a snapshot in a list of snapshots for a particular case.

At step 510, the snapshot tool 107 determines whether the request is valid, e.g., whether a snapshot exists for the point in time specified in the request. If not, then at step 515, the snapshot tool 107 may return an error. The management application 106 may present the error to a requesting user. Otherwise, at step 520, the snapshot tool 107 retrieves the requested snapshot from a repository maintained by the case management system.

At step 525, the evaluation component 210 identifies the case metadata in the snapshot. At step 530, the evaluation component 210 identifies and retrieves files specified in the snapshot. At step 535, the evaluation component 210 identifies states of workflows provided in the snapshot. The identified and retrieve case metadata, files, and workflow data can be presented via a user interface provided by the management application 106.

At step 540, the presentation component 220 generates a view of the case as captured in the retrieved snapshot. The view includes the retrieved case metadata, files, and workflow state data. The presentation component 220 may invoke APIs used to generate a graphical display to be presented on a user interface. At step 545, the presentation component 220 presents the generated graphical display. Once displayed, the user may view a state of the case as captured in the snapshot.

Figure 6:
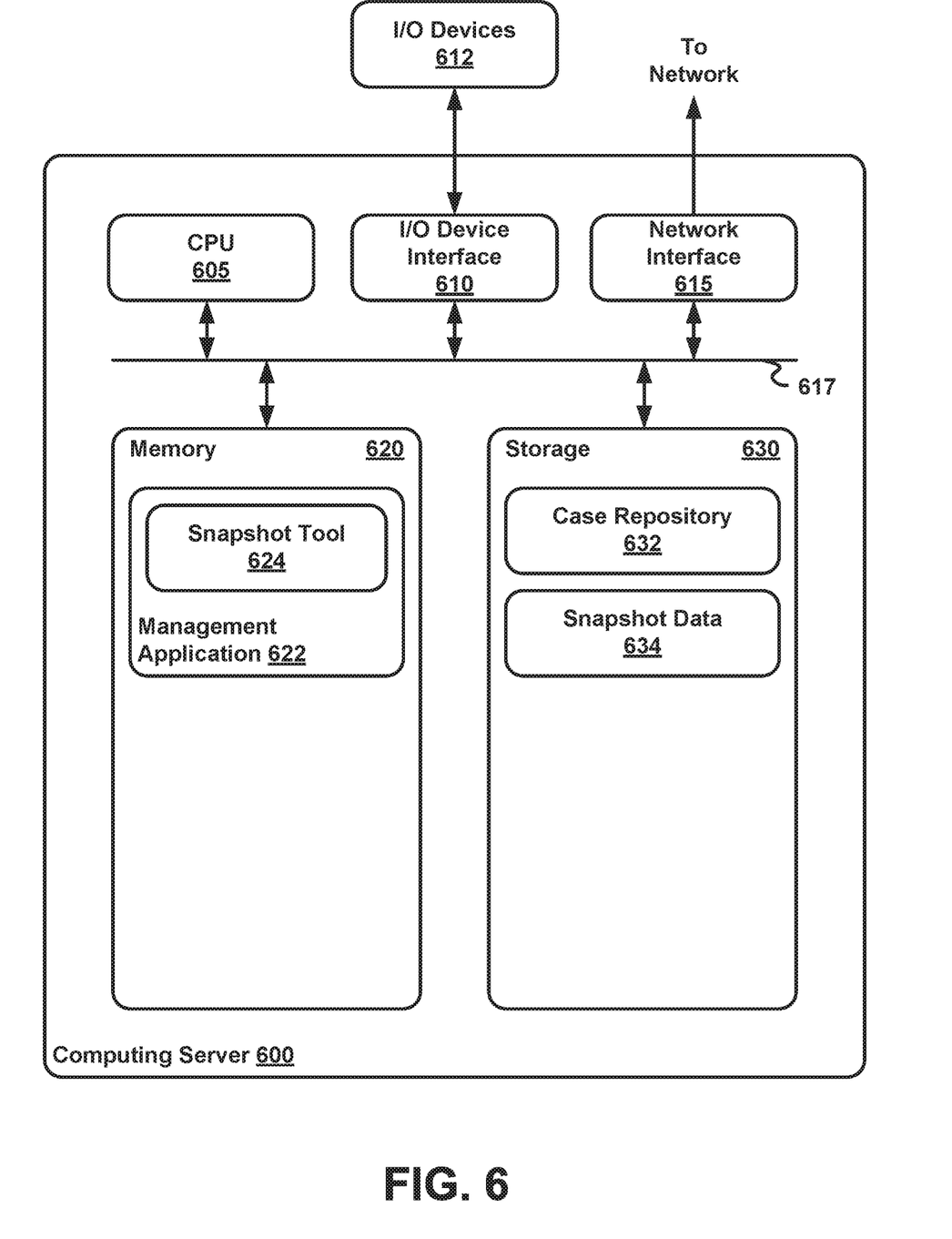
FIG. 6 illustrates an example computing system configured to capture a snapshot of an electronic case, according to one embodiment.

FIG. 6 illustrates an example computing system 600, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, the memory 620 includes a management application 622, which itself includes a snapshot tool 624. The storage 630 includes a case repository 632 and snapshot data 634. Note, the case repository 632 and snapshot data 634 are depicted as being stored on the computing server 600, but one of skill in the art will recognize that the case repository 632 and the snapshot data 634 are not required to be located on the same server as the management application 622. For example, the case repository 632 may reside on another server separate from the snapshot data 634, which itself could reside on another server. The management application 622 builds, edits, and updates cases (e.g., by control of an enterprise user). Further, the management application 622 may store the cases in the case repository 632.

In one embodiment, the snapshot tool 624 captures snapshot data 634 of a case, which is a file object that represents the case as captured at a given point in time in the case lifecycle. The snapshot tool 624 stores, in a snapshot object, case metadata, files, and workflow state information. The snapshot may then be stored in a repository (e.g., snapshot data 634). Further, the snapshot tool 624 may retrieve a given snapshot from the repository and present the snapshot via a user interface.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the snapshot tool or related data available in the cloud. For example, the snapshot tool could execute on a computing system in the cloud and capture a snapshot of electronic case data at a given point in time. In such an example, the snapshot tool could identify metadata, files, and workflows associated with the case and store the identified data to a snapshot data object, which itself may be uploaded to at a storage location in the cloud. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A computer program product, comprising:
 a computer-readable storage medium storing instructions, which, when executed on a processor, performs an operation comprising:
  receiving, via the processor, a request to capture a snapshot of an electronic case at a first point in time,
  identifying information associated with the electronic case at the first point in time, wherein the information identifies a first file, upon determining that content of the first file cannot be changed, generating a pointer to the first file, and storing the information associated with the electronic case and the pointer to the first file in an object representing the snapshot.

2. The computer program product of claim 1, wherein the information includes metadata, identifies a plurality of files, and one or more workflows.

3. The computer program product of claim 2, wherein the operation further comprises, for at least a first file in the plurality of files:

determining a version of the first file at the first point in time.

4. The computer program product of claim 3, wherein storing the information associated with the electronic case comprises:

storing the version of the first file in the object representing the snapshot.

5. The computer program product of claim 2, wherein storing the information associated with the electronic case in an object representing the snapshot comprises:

identifying a state of at least a first workflow of the one or more workflows at the first point in time; and storing the state of the at least the first workflow in the object representing the snapshot.

6. The computer program product of claim 1, the operation further comprising:

determining a type of a repository in which a second file is maintained;

determining, based on the type of the repository, that the repository does not lock content of the second file; and based on determining that the repository does not lock the content of the second file:

generating a copy of the second file; and storing the copy of the second file in the object representing the snapshot.

7. The computer program product of claim 1, wherein the operation further comprises:

receiving a request for data associated with the electronic case at the first point in time;

retrieving the object representing the snapshot;

generating a graphical presentation of the information associated with the electronic case; and displaying the graphical presentation via a user interface.

8. A system, comprising:

a processor; and a memory storing program code, which, when executed on the processor, performs an operation comprising:

receiving, via the processor, a request to capture a snapshot of an electronic case at a first point in time, identifying information associated with the electronic case at the first point in time, wherein the information identifies a first file, upon determining that content of the first file cannot be changed, generating a pointer to the first file, and storing the information associated with the electronic case and the pointer to the first file in an object representing the snapshot.

9. The system of claim 8, wherein the information includes metadata, identifies a plurality of files, and one or more workflows.

10. The system of claim 9, wherein the operation further comprises, for at least a first file in the plurality of files:

determining a version of the first file at the first point in time.

11. The system of claim 10, wherein storing the information associated with the electronic case comprises:

storing the version of the first file in the object representing the snapshot.

12. The system of claim 9, wherein storing the information associated with the electronic case in an object representing the snapshot comprises:

identifying a state of at least a first workflow of the one or more workflows at the first point in time; and storing the state of the at least the first workflow in the object representing the snapshot.

13. The system of claim 8, the operation further comprising:

determining a type of a repository in which a second file is maintained;

determining, based on the type of the repository, that the repository does not lock content of the second file; and based on determining that the repository does not lock the content of the second file:

generating a copy of the second file; and storing the copy of the second file in the object representing the snapshot.

* * * * *